(12) United States Patent
Swartzentruber et al.

(10) Patent No.: US 8,848,746 B2
(45) Date of Patent: Sep. 30, 2014

(54) PACKET PROTOCOL PROCESSING WITH PRECISION TIMING PROTOCOL SUPPORT

(75) Inventors: Ron Swartzentruber, Amesbury, MA (US); Wiliam D. Lopoulos, Tyngsboro, MA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 429 days.

(21) Appl. No.: 12/828,190

(22) Filed: Jun. 30, 2010

(65) Prior Publication Data

US 2012/0002558 A1  Jan. 5, 2012

(51) Int. Cl.
*H04J 3/06* (2006.01)
*H04L 7/04* (2006.01)

(52) U.S. Cl.
CPC .............. *H04L 7/042* (2013.01); *H04J 3/0661* (2013.01)
USPC ............ 370/509; 370/389; 370/392; 370/503

(58) Field of Classification Search
None
See application file for complete search history.

(56) References Cited

U.S. PATENT DOCUMENTS

| | | | |
|---|---|---|---|
| 5,477,541 A * | 12/1995 | White et al. | 370/392 |
| 5,509,006 A | 4/1996 | Wilford et al. | |
| 5,517,505 A * | 5/1996 | Buchholz et al. | 370/350 |
| 6,651,099 B1 * | 11/2003 | Dietz et al. | 709/224 |
| 6,687,752 B1 * | 2/2004 | Falco et al. | 709/230 |
| 6,735,223 B1 * | 5/2004 | Woo et al. | 370/516 |
| 6,789,116 B1 * | 9/2004 | Sarkissian et al. | 709/224 |
| 6,904,057 B2 | 6/2005 | Sarkinen et al. | |
| 7,440,417 B2 | 10/2008 | Gallo et al. | |
| 7,529,187 B1 * | 5/2009 | Hernacki et al. | 370/230 |

(Continued)

OTHER PUBLICATIONS

International Search Report on corresponding PCT application (PCT/US2011/042629) from International Searching Authority (KIPO) dated Feb. 27, 2012.

(Continued)

*Primary Examiner* — Michael J Moore, Jr.
(74) *Attorney, Agent, or Firm* — Klein, O'Neill & Singh, LLP

(57) ABSTRACT

Device and methods determine timing parameters and associated timing actions from timing messages in communication packets. The timing messages may be encapsulated with a plurality of communication protocols. An example timing message may be an IEEE 1588 timing message encapsulated in an Internet protocol packet encapsulated in an Ethernet protocol packet. The protocols are matched in classifier blocks by comparing portions of the packet to bit values or ranges of values. Operation of other than the first classifier block depends on results of matching in the preceding block by using offset values passed between blocks that indicate starting points for the matching. The final classifier block matches values in timing messages to identify timing parameters and associated timing actions in the message.

11 Claims, 5 Drawing Sheets

(56) References Cited

U.S. PATENT DOCUMENTS

| | | | |
|---|---|---|---|
| 7,561,569 B2 * | 7/2009 | Thiede | 370/389 |
| 7,643,486 B2 * | 1/2010 | Belz et al. | 370/392 |
| 7,680,117 B1 * | 3/2010 | Kumar et al. | 370/392 |
| 7,756,233 B2 * | 7/2010 | Inoue et al. | 375/356 |
| 7,787,438 B2 * | 8/2010 | Dowse | 370/350 |
| 7,835,402 B2 * | 11/2010 | Erich et al. | 370/503 |
| 8,180,892 B2 * | 5/2012 | Deridder et al. | 709/224 |
| 2002/0072346 A1 | 6/2002 | Kato et al. | |
| 2004/0233911 A1 * | 11/2004 | Morris | 370/395.5 |
| 2005/0232290 A1 | 10/2005 | Mathew et al. | |
| 2007/0286195 A1 * | 12/2007 | Ilnickl et al. | 370/392 |
| 2008/0117938 A1 * | 5/2008 | Erich et al. | 370/503 |
| 2009/0204811 A1 * | 8/2009 | Fries et al. | 713/160 |
| 2010/0034212 A1 | 2/2010 | Yavuz et al. | |
| 2010/0265970 A1 * | 10/2010 | Toscano | 370/522 |
| 2011/0273995 A1 * | 11/2011 | Ahn et al. | 370/241 |

OTHER PUBLICATIONS

Written Opinion on corresponding PCT application (PCT/US2011/042629) from International Searching Authority (KIPO) dated Feb. 27, 2012.

* cited by examiner

PACKET PROTOCOL PROCESSING WITH PRECISION TIMING PROTOCOL SUPPORT

BACKGROUND OF THE INVENTION

The present invention relates generally to processing of data packets pursuant to communication protocols and, more particularly, to processing of data packets for a precision timing protocol.

It may be advantageous for devices in a communication network to utilize a common time base. The common time base may be used, for example, to trigger coordinated events in a network of sensors or to coordinate actions of controllers in an industrial system. In addition to sensors and controllers, the system may include computers and communication devices, such as routers.

The electronics industry has developed several standard protocols for use in synchronizing clocks, for example, the OAM functions and mechanisms of ITU-T Recommendation Y.1731 and the Precision Time Protocol (PTP) of IEEE standard 1588. The timing protocols may include sending timing-related messages between nodes in a communication network. The timing-related messages may include, for example, a node transmitting a time-stamped packet to supply its timebase to another node and a node transmitting a packet requesting the receiving node to reply with the time of receipt. Unfortunately, the use of possibly multiple timing related protocols may present difficulties.

In addition, the timing-related messages may be communicated using one or more protocols. Information in communication networks is formatted according to communication protocols. Communication protocols are commonly described in published standards. Many communication networks send and receive the information in packets. The communication protocols specify where various pieces of information are placed in the packets. For example, an identifier of the sender of the packet, an identifier of the intended recipient of the packet, and the message to be communicated may be placed in the packet in three locations defined by the communication protocol.

Unfortunately, each communication protocol may establish its own unique definition of where the various pieces of information are placed within a packet. Moreover, a communication network may use multiple protocols. Furthermore, multiple protocols may be used in sending one packet with a packet formatted according to a first protocol encapsulated in a packet formatted according to a second protocol, which is encapsulated in a packet formatted according to a third protocol, and so on. In addition, some network devices may process some packets which do require timing related actions and some packets which do not.

BRIEF SUMMARY OF THE INVENTION

Aspects of the present invention provide for determination of location of timing related information and/or timing related actions.

In some aspects the invention provides a method of determining a timing related action by a PHY, comprising: receiving a packet; determining an encapsulation scheme for the packet by performing a plurality of comparisons of portions of the packet with identified bit patterns; and determining an action to take regarding modification of a time stamp of the packet based on a result of at least one of the comparisons of the plurality of comparisons.

In some aspects the invention provides a method of determining a time stamp modification action by a PHY of an Ethernet switch, comprising: determining an encapsulation scheme for an Ethernet packet by sequentially performing at least one comparison on bits of the packet with identified bit patterns; determining a location in the packet of a time stamp; and determining an action to take with respect to the time stamp.

In some aspects the invention provides a method of determining how to adjust a time stamp, comprising: providing a packet to a plurality of sequentially arranged comparison blocks, sequentially performing a comparison of bits of the packet with preidentified bits by at least some of the sequentially arranged comparison blocks; providing, by each of the comparison blocks other than an ultimate comparison block, an offset indicator to a subsequent comparison block of the plurality of sequentially arranged comparison blocks; and determining, by the ultimate comparison block, an action to take with respect to the time stamp.

In some aspects the invention provides circuitry in a physical layer (PHY) device for at least determining a location of a time stamp, comprising: start of frame circuitry for determining a start of a frame signal; and alignment circuitry for aligning data of a frame in accordance with the start of frame signal; at least one set of classifier blocks, each of the classifier blocks configured to compare bits of the frame with preidentified bits indicated by an offset for at least the classifier blocks other than an initial one of the classifier blocks of the set of classifier blocks, with the last of the classifier blocks indicating a time stamp location.

In some aspects the invention provides a method of extracting information from a packet using a plurality of stages, comprising: receiving a packet; matching, in a first stage of the plurality of stages, the packet to a first plurality of field values and producing a first next stage identifier and a first offset value; if the next stage identifier indicates a second stage, matching, in a second stage of the plurality of stages, the packet beginning at the first offset value to a second plurality of field values and producing a second next stage identifier and a second offset value; if the first next stage identifier indicates a final stage, matching, in a final stage of the plurality of stages, the packet beginning at the first offset value to a final plurality of field values and producing an action identifier and a parameter value; and if the second next stage identifier indicates a final stage, matching, in a final stage of the plurality of stages, the packet beginning at the second offset value to a final plurality of field values and producing an action identifier and a timing parameter.

These and other aspects of the invention are more fully comprehended upon review of this disclosure.

DETAILED DESCRIPTION

Figure 1:
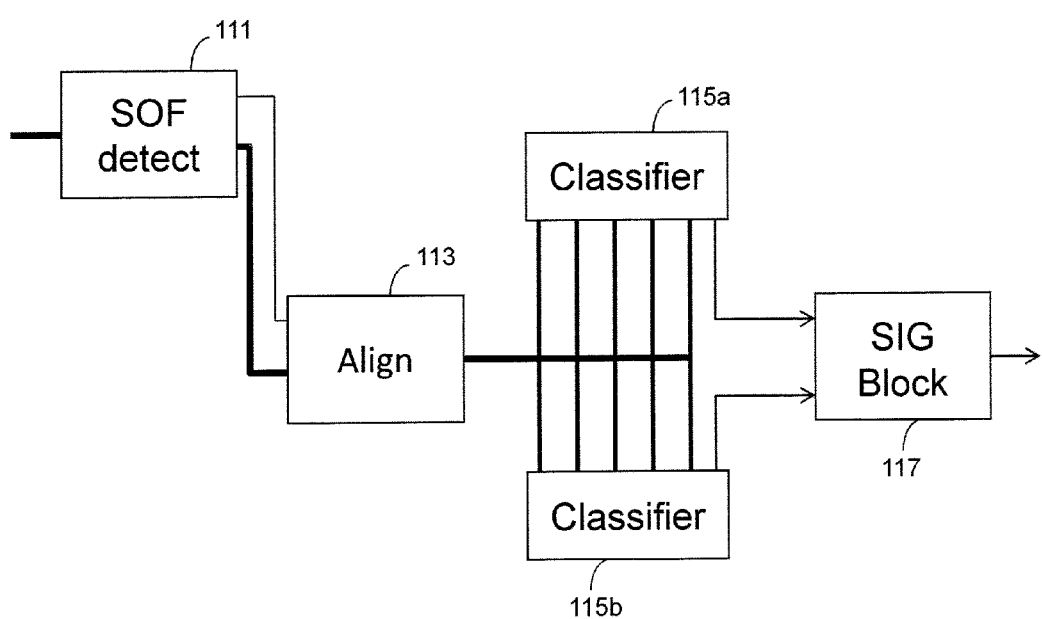
FIG. 1 is a block diagram of a device for extracting parameters from timing messages and determining timing related actions in accordance with aspects of the invention.

FIG. 1 is a block diagram of a device for extracting parameters from timing messages and determining timing related actions in accordance with aspects of the invention. The device may be part of an integrated circuit, for example, an Ethernet physical layer circuit (PHY). In many embodiments the device may be comprised of electronic circuitry, although in some embodiments the device may include both hardwired circuitry and programmable elements, for example as determined by registers or through the use of a processor configured or configurable by program instructions in addition to other circuitry, and in some embodiments the functions of the device may be implemented solely by a processor configured by program instructions.

The device of FIG. 1 includes a start of frame (SOF) detection block 111 to receive input packets from a communication network and identify where the received packets start. An alignment module 113 uses the identified starts of the packets, in some embodiments, to align the packets with a bus boundary. The bus with the aligned packets is passed to a classifier, or as, illustrated in the embodiment of FIG. 1, a set of classifiers 115a-b that parse and classify the packets to extract timing parameters for subsequent processing and determine timing related actions. The classifiers may also pass portions of the packets to a signature block 117 which combines the portions to form a signature that may be used to identify individual ones of the packets.

In more detail, in some embodiments, the SOF detection block 111 receives the input packets on an input bus and detects when SOF signals occur in the input packets. The input bus may have a bit width wider than the units of information, commonly bytes, used in the packets. For example, an embodiment of the device receiving input packets at 10 Gbit/s may use a 32-bit wide input bus resulting in values being on the input bus for a relatively long period. The SOF detection block 111 may receive packets from a 10-gigabit media independent interface (XGMII).

The SOF detection block 111 detects an SOF according to the protocol with which the packets are formatted. For example, when the received packets are Ethernet packets, SOF is detected when a start frame delimiter (SFD) follows a packet preamble. When a packet is formatted with multiple protocols, frame start is detected for an outer protocol of the multiple protocols.

The SOF detection block 111 sends a signal indicating detections of an SOF along with the packets to the alignment block 113. The signal indicating detections of an SOF may signal a position on the bus conveying the packet information in addition to when a start of frame occurs. For example, in a device with a 32-bit bus and locations for starts of packets on 8-bit boundaries, the signal indicating detections of an SOF may signal one of four positions for the start of a frame.

The alignment module 113 places the first information of the frame on a bus in the location corresponding to the first received bits. The aligned information from the alignment module 113 is supplied to the classifiers 115a-b. In an embodiment classifying timing messages from Ethernet frames, the aligner places the first byte of the frame after the SFD in the least significant byte of the bus. In some embodiments, packets may be supplied from the SOF detection block 111 with their starting information aligned to the bus boundary, for example, when sizes of the bus from the SOF detection block 111 and the units of information in the packets match. In these embodiments, the alignment module may be omitted. The buses input to the SOF detection block 111, between the SOF detection block 111 and the alignment module 113, and between the alignment module 113 and the classifiers 115a-b may have the same or differing bit widths.

The classifiers 115a-b process the aligned packets to identify parameters from timing messages and determine timing related actions for subsequent processing. Each classifier parses each aligned packet to determine whether a timing message is included in the packet. The classifier may extract timing actions and timing parameters when a timing message is included in the packet. Whether the classifier extracts timing actions and parameters may additionally depend on a classification of the packet. A packet may be classified, for example, using label values in a multiprotocol label switching (MPLS) header, values of host addresses or ports in an Internet protocol header, values of MAC addresses in an Ethernet header, or values of PTP domain numbers. In some embodiments, packets are classified using flows defined by values of a field or a combination of fields from the protocols used to format a packet. Each classifier may operate on multiple combinations of protocols and field values for the protocols.

Operation of the classifiers is configured by a set of parameters. The parameters may be supplied by a processor or other components in a circuit, for example, user programmable registers, incorporating the device. The parameters indicate locations of fields within the protocols being classified, field values, such as bit values with bit masks or value ranges, and what actions to take when a field matches a parameter. The actions may include a pointer to another set of parameters to use in further classifying the packet.

Devices may include differing numbers of classifiers depending on the number of protocols, formats, and flow combinations from which timing actions and parameters are to be extracted. In various embodiments the classifiers operate on the same packets simultaneously or substantially simultaneously. In embodiments with multiple classifiers, when more than one classifier positively identifies timing actions and parameters from one packet, which results are sent from the device is determined based on a prioritization. An embodiment may prioritize based on an ordering of the classifiers.

In some embodiments, the classifiers 115a-b also extract portions of the packets to create a signature that identifies the packet. The portions extracted are also determined by configuration parameters of the classifier. The signature portions of the packet are extracted as the corresponding portion is received by the classifier. The portions are sent to the signature block 117. The signature block 117 combines the portions to form a signature for the packet. In some embodiments, the signature block 117 may select only some of the signature portions sent from the classifiers to use in forming the signature. For example, the classifier 115 may receive eight sequential bytes from an IP header containing a source address and a destination address, and the signature block 117 may select the first byte of the source address and the first two bytes of the destination address for use in assembling the signature. Embodiment may form the signature by concatenating the selected signature portions. Other embodiment may use a hash function to form the signature.

Signature portions are received and assembled by the signature block 117 for each classifier present in an embodiment of the device. The signature block 117 sends the assembled signature from the device according to which of the classifiers produces timing actions and parameters. In some embodiments of a device for extracting actions and parameters from timing messages, signature assembly may be performed in each of the classifiers.

Figure 2:
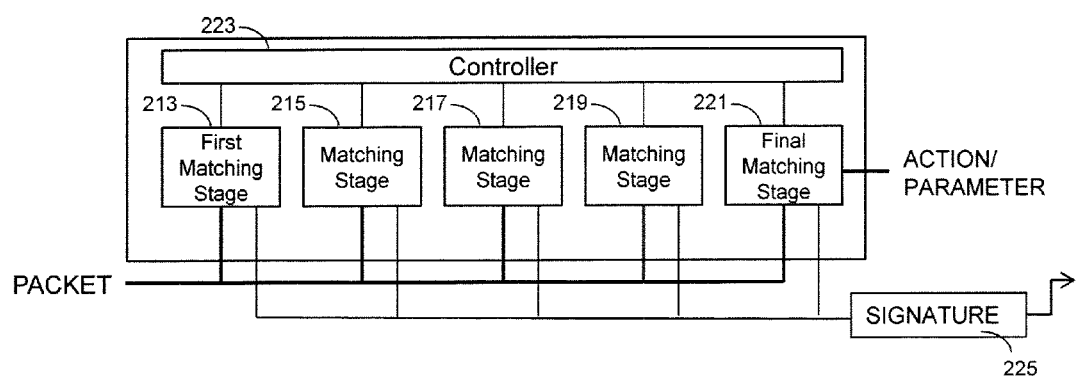
FIG. 2 is a block diagram of a timing message classifier in accordance with aspects of the invention.

FIG. 2 is a block diagram of an embodiment of a timing message classifier in accordance with aspects of the invention. The timing message classifier may be used as a classifier 115a-b in the device illustrated in FIG. 1. The timing message classifier includes a plurality of matching stages that process received packets according to protocols used to format the packets or messages in the packets. Each stage may process the packets for one protocol or, depending on parameters provided to the stage, for multiple similar protocols. Additionally, an embodiment may include some matching stages that are dedicated to processing particular protocols and other stages that are more generally configurable to process various protocols. The processing may include parsing, classifying, and extracting fields from the packets.

A first matching stage 213 processes the packets according to an outer protocol and determines whether additional processing is to be performed for the packet and what the additional processing will be. When additional processing is to be performed, the stage supplies a pointer identifying the location in the packet where the additional processing should begin. A final matching stage 221 performs its processing according to a timing protocol and may identify timing parameters and associated timing actions to be sent from the timing message classifier.

Intermediate matching stages may be included in the timing message classifier. The embodiment of FIG. 2 includes a second matching stage 215, a third matching stage 217, and a fourth matching stage 219 as intermediate matching stages. Each intermediate matching stage processes received packets according to an intervening protocol used to format the received packets. Each matching stage may supply portions of the packets to a signature block 225 where the portions are combined to create a signature that may be used to identify a specific packet. An example packet that includes an IEEE 1588 timing message, encapsulated in an Internet protocol, encapsulated in an Ethernet protocol may be processed in the first matching stage 213 for the Ethernet encapsulation, in the second matching stage 215 for the Internet protocol encapsulation, and in the final matching stage 221 for the IEEE 1588 timing message.

A controller 223 controls operations of the matching stages. The controller 223 may supply values used in the processing of the matching stages and control the sequence in which the matching stages process the packets. The controller 223 may also enable operation of the matching stages. After the starting information in a packet is processed in the first matching stage 213, the controller 223 may enable a next matching stage based on results from the first matching stage. The controller 223 supplies a pointer included in the results to the next matching stage to signal where in the packet the next matching stage should perform its matching operations. Subsequent matching stages may similarly be enabled by the controller. In other words, the controller 223 enables the matching stages to operate on the packet to determine timing parameters and associated timing actions from the combined results of the matching stages. The sequence of matching stages may be considered a linked list.

In more detail, each matching stage compares the information in the packets to sets of parameter values. The parameter values specify where in the packet and how matching is to be performed and what action results when a match is determined. One embodiment includes eight sets of parameters and performs comparisons for each of eight flows concurrently. When matches are determined to multiple sets of parameter values, the matching stage selects one of the matches based on a priority ordering of the sets of parameters.

Each set of parameter values includes one or more field locations identifying an offset relative to the point in the packet where matching for the next stage will begin. In some embodiments, a field location in a matching stage may be fixed, for example, to a zero offset or to the location of a particular field in a communication protocol. In particular, when a matching stage is dedicated to a particular protocol, some parameters may be fixed or calculated from characteristics of the protocol. For each of the field locations, the parameter values include key values for matching. The key values may be ranges with a match determined when the information in the packet at the identified field location is between minimum and maximum values. The key values may also be bit values with bit masks with a match determined with the information in the packet at the identified field location equals the bit values at unmasked bit positions. Range and bit value keys may be combined with a match determined disjunctively or conjunctively.

Some embodiments include, in the parameter sets, values specifying field locations and lengths for producing a packet signature. The matching stage supplies values from the packet at specified location having the specified length to the signature block 225.

Each set of parameter values also includes values specifying subsequent actions when a match is determined. For the first matching stage and any intermediate matching stages, the subsequent action may specify a next matching stage and an offset from which the next matching stage should perform its matching. Alternatively, the controller 223 may specify the next matching stage. The offset is relative to the point in the packet that the matching stage began its matching operations.

The final matching stage includes parameters specifying actions that determine outputs produced by the classifier. The outputs may include timing parameters taken from locations in the packet specified by parameters. The outputs include actions related to timing operations such as adding or subtracting combinations of selected ones of the output timing values, a local time value, and selected offset of correction values. When no match is determined a no-operation action may be signaled.

In some embodiments, the matching stages have functions dedicated to particular protocols. For example, ones of the matching stages may include specialized sets of parameters appropriate for classifying values in an Ethernet header and others of the matching stages may include specialized sets of parameters appropriate for classifying values in an IP header. Accordingly, the set of parameters may differ in numbers of values and ranges of values possible.

The number of parameters, in some embodiments, may be reduced by sharing values for multiple uses. For example, two field locations parameters may be used with the same matching values to match to either a destination or a source address. The number of parameters, in some embodiments, may also be reduced by using default values, for example, performing a matching operation using an offset location of zero.

Figure 3:
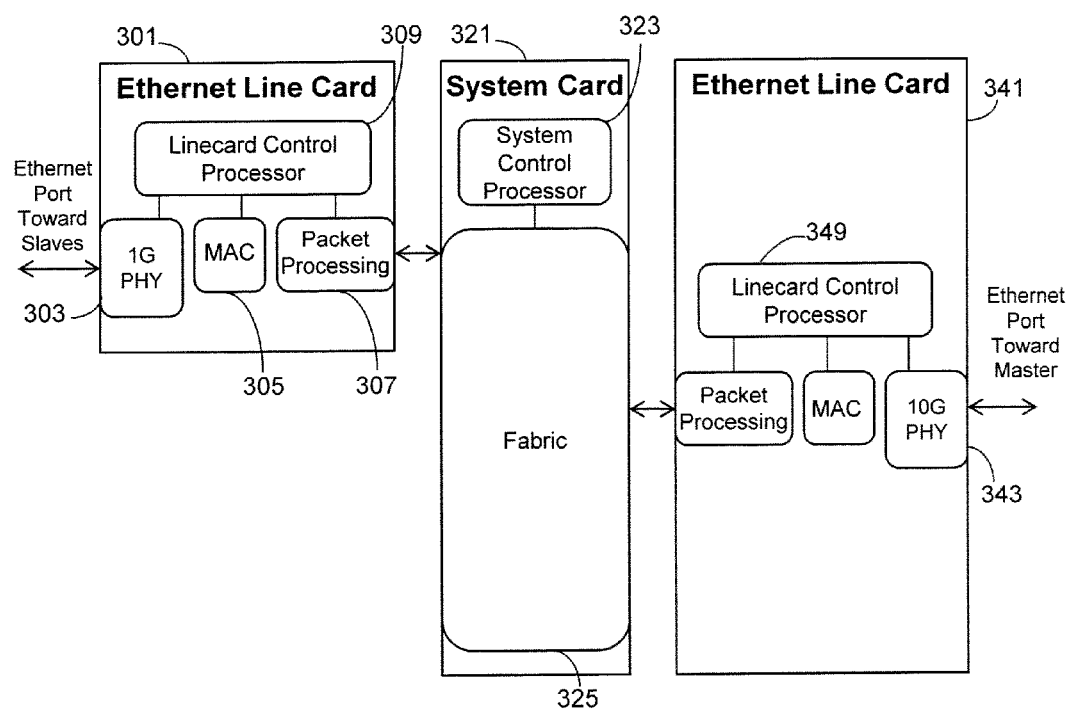
FIG. 3 is a block diagram of a communication network node in accordance with aspects of the invention.

FIG. 3 is a block diagram of a communication network node in accordance with aspects of the invention. The node includes a first line card 301 and a second line card 341. Other embodiments may have a greater number of line cards. Each line card is coupled to a physical medium, such as a fiber optic link, and to a system card 321. The line cards transmit and receive packets over the physical media and supply and receive packets to and from the system card. The line cards may process some of the information before transmitting it on the physical media or supplying it to the system card.

The system card illustrated in the embodiment of FIG. 3 includes a switching fabric 325 that routes packets between the line cards. A control processor 323 is included in system card and configures operation of the switching fabric. The control processor may additionally process packets identified by the line cards for additional processing of timing information.

The first line card 301 is coupled to the system card 321 by a packet processing block 307 that may modify packets according to requirements of the line card and the system card. A line-card control processor 309 provides programmable operations for the line card such as setting configurations and handling exceptions from other blocks of the line card. A media access control (MAC) block 305 that performs operations for the Ethernet MAC sublayer. The first line card uses a gigabit Ethernet PHY 303 to couple to the physical medium. Packets arriving at the line card are generally received by the PHY, transferred to the MAC block and then to the system card. Packets from the line card are generally transmitted by the PHY after being transferred from the system via the MAC block.

The gigabit Ethernet PHY 303 includes circuitry to provide processing for timing protocols. In particular, the PHY may include devices for extracting timing messages and determining timing related actions as illustrated in FIG. 1. The PHY may also include a timing message classifier as illustrated in FIG. 2. Other circuitry in the PHY may perform timing related actions, for example, modifying a time stamp parameter according to a delay in the node. Some embodiments of the first line card may couple to multiple physical media links and include a corresponding number of PHYs. Each physical medium link may be associated with a port of the line card. The multiple PHYs may be integrated in one integrated circuit. The circuitry to provide processing for timing protocols in multiple PHYs may use common configuration parameters. The configuration parameters may also be partially shared between PHYs, for example, a set of parameters for matching may be shared by multiple PHYs with each PHY have an unshared parameter to enable use of the matching parameters. Additionally, one circuit may provide processing for timing parameters for packets associated with multiple physical media links, or be configurable for use with one of multiple links.

The second line card 341 is similar to the first line card 301. However, the second line includes a 10 gigabit Ethernet PHY 343. The other components of the line card may also differ from those of the first line card for the higher data rate. As with the gigabit Ethernet PHY of the first line card, the 10 gigabit Ethernet PHY 343 includes circuitry to provide processing for timing protocols. In particular, the PHY may include devices for extracting timing messages and determining timing related actions as illustrated in FIG. 1. The PHY may also include a timing message classifier as illustrated in FIG. 2. Some embodiments may include multiple PHYs integrated in one integrated circuit.

Figure 4:
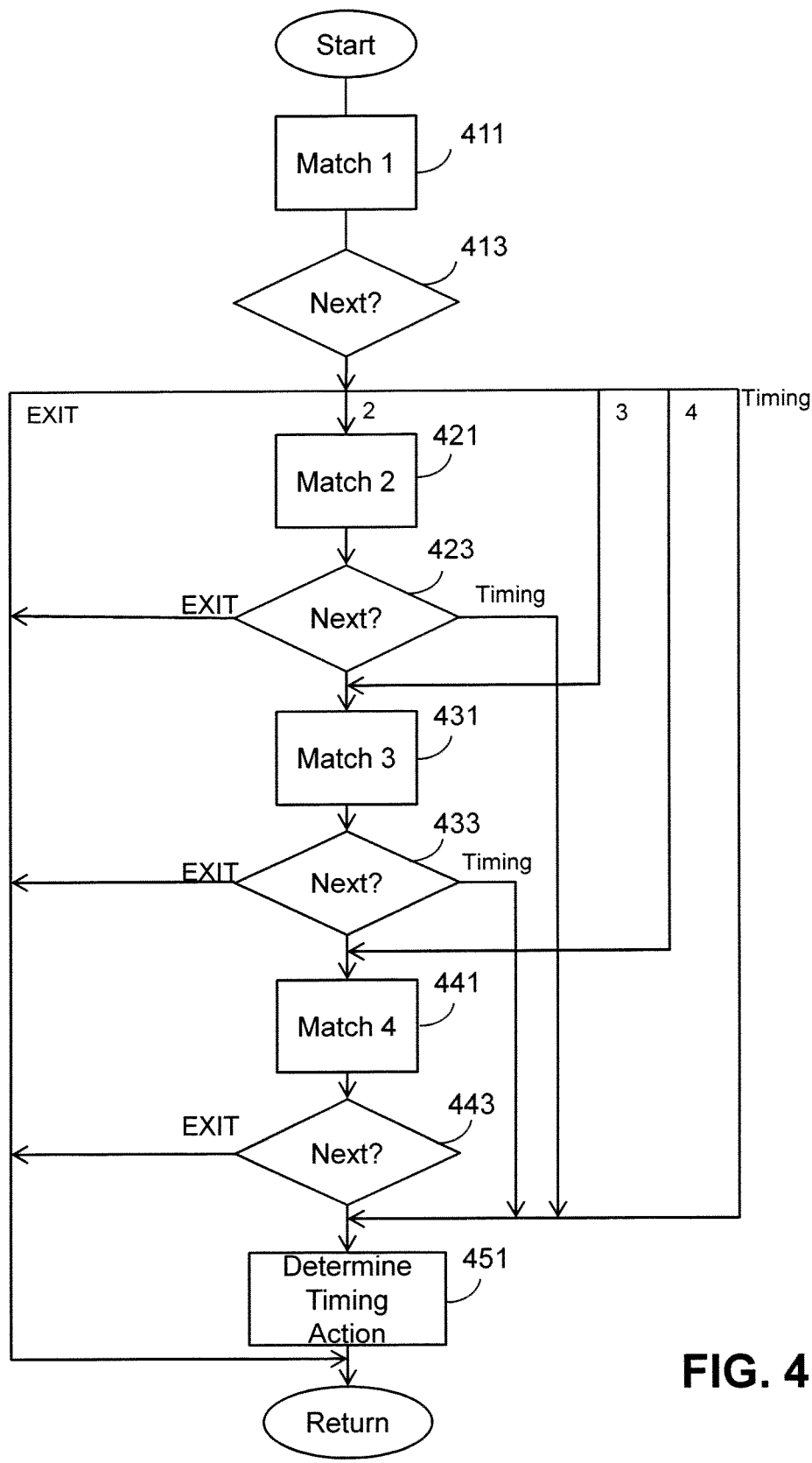
FIG. 4 is a flowchart of a process for classifying packets and extracting information from timing messages in accordance with aspects of the invention.

FIG. 4 is a flowchart of a process for classifying packets and extracting information from timing messages in accordance with aspects of the invention. The process may be implemented in a PHY device and more particularly may be implemented by the devices of FIG. 1 or FIG. 2. Additionally, the process may be implemented using specialized hardware, a processor programmed by instructions, or a combination. Generally, the process is supplied packets of information and identifies timing parameters and associated actions that may be contained in the packets and that should be identified or supplied for subsequent performance of the actions.

In block 411, the process performs matching for a first protocol. The first protocol is an outer, or lower layer, protocol according to which the packet is supplied to the process. The packet is classified by comparing portions of the packet to sets of parameters that specify values at various locations in the packet that are considered matching. Associated with the sets of parameters for matching are values that identify a next stage of processing. For example, when the packet follows an Ethernet standard, the process may compare a location in the packet having an Ethertype value to 0x8847 and when there is match, determine that the next stage should be one for MPLS and the process may compare the location in the packet having the Ethertype value to 0x88F7 and when there is match, determine that the next stage should be a timing stage to analyze an IEEE 1588 message.

In block 413, the process determines what stage should be performed next based on the results of the matching performed in block 411. In the embodiment illustrated in FIG. 4, there are five possible next stages. Other embodiments may include a different number of stages. When there are no matches in block 411, the process determines that there is no next stage for the packet and returns. When the match determined in block 411 indicates that the next stage should be the timing stage, the process continues to block 451. Otherwise, the process continues block 421 to perform a second matching operation, block 431 to perform a third matching operation, or block 441 to perform a fourth matching operation.

In block 421, the process performs matching for a second protocol. The matching begins at an offset from a start of the packet determined in block 411. The offset may point to a header formatted according to the second protocol. Similar to block 411, the process compares portions of the packet to sets of parameters that specify what values at various locations in the packet are considered matching and when a match occurs, identifies a next stage of processing.

In block 423, the process determines what stage should be performed next based on the results of the matching performed in block 421. In the embodiment illustrated in FIG. 4, there are three possible next stages. When there are no matches in block 421, the process determines that there is no next stage for the packet and returns. When the match determined in block 421 indicates that the next stage should be the timing stage, the process continues to block 451. Otherwise, the process continues block 431 to perform a third matching operation. Other embodiments of the process may include block 441 as a possible next stage.

In block 431, the process performs matching for a third protocol. The matching begins at an offset from a start of the packet determined in the prior matching block. The offset may point to a header formatted according to the third protocol. Similar to blocks 411 and 421, the process compares portions of the packet to sets of parameters that specify what values at various locations in the packet are considered matching and when a match occurs, identifies a next stage of processing.

In block 433, the process determines what stage should be performed next based on the results of the matching performed in block 431. In the embodiment illustrated in FIG. 4, there are three possible next stages. When there were no matches in block 431, the process determines that there is no next stage for the packet and returns. When the match determined in block 431 indicates that the next stage should be the timing stage, the process continues to block 451. Otherwise, the process continues block 441 to perform a fourth matching operation. Other embodiments of the process may include other possible next stages, for example, block 421.

In block 441, the process performs matching for a fourth protocol. The matching begins at an offset from a start of the packet determined in the prior matching block. The offset may point to a header formatted according to the fourth protocol. Similar to other matching blocks, the process compares portions of the packet to sets of parameters that specify what values at various locations in the packet result are considered matching and when a match occurs, identifies a next stage of processing.

In block 443, the process determines what stage should be performed next based on the results of the matching performed in block 441. In the embodiment illustrated in FIG. 4, there are two possible next stages. When the match determined in block 431 indicates that the next stage should be the timing stage, the process continues to block 451; otherwise, the process returns. Other embodiments of the process may include other possible next stages, for example, blocks 421, 431, and 441 may be performed in various orders.

In block 451, the process determines timing actions for the packet. The process may also determine parameters from the packet for use in performing the timing actions. For example, a time action may indicate how a time stamp parameter should be modified. The process determines the timing parameters and actions by comparing portions of the packet to sets of parameters that correspond to various timing actions. When a match occurs, specific portions of the packet may also be supplied as parameters for the timing actions. The process performs block 451 relative to a location in the packet specified by the preceding matching stage. The location may be location of a timing message, for example, a message formatted according to IEEE 1588 or ITU-T Y.1731. Thereafter, the process returns.

Figure 5:
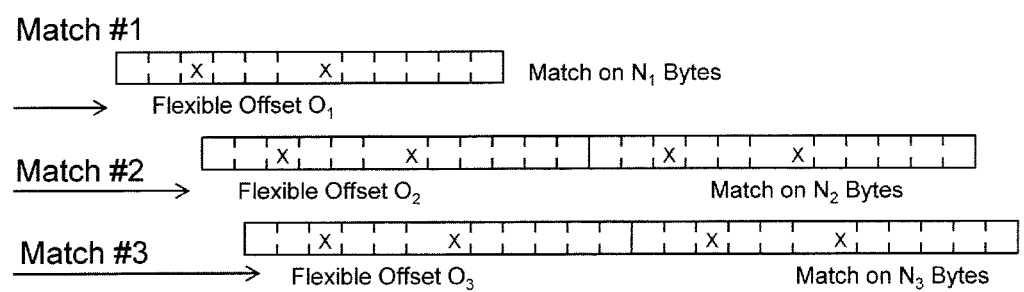
FIG. 5 is a diagram of exemplary frame header matching in accordance with aspects of the invention.

FIG. 5 shows an example of a frame header matching scheme which may be used in accordance with aspects of the invention. The matching scheme may be implemented, for example, by use of comparison blocks of the circuitry of FIG. 2. In using the circuitry of FIG. 2, the controller block may have or be provided, for example, through the use of user programmable registers, an indication of a target protocol encapsulation for the comparison blocks to utilize. In some embodiments, the registers may contain matching patterns, an order for use of the matching patterns, and, in some embodiments, offsets and possibly bit masks to utilize in performing matching.

In the example of FIG. 5, three matches are checked, for example, to determine if a PTP over MPLS/PWE packet is being processed. Each match may be checked, for example, using three of the comparison blocks of the circuitry of FIG. 2, with the controller block commanding non-use of a fourth comparison block (or alternatively a bit masking pattern that masks all bits subject to matching). If three matches are detected, a subsequent block may examine portions of the packet relating to PTP information of the message and, in some embodiments, determine appropriate actions to take regarding the PTP information. For ease of illustration, the three section are shown overlapping; however, the sections of packets used for matching generally distinct.

Continuing with reference to the example of FIG. 5, a first comparison determines if $N_1$ bytes match predetermined bytes of a packet header, beginning at an offset $O_1$. In many embodiments, the offset $O_1$ is zero so that the first comparison begins with the start of the packet header. As illustrated in FIG. 5, two of the bytes in the packet header include an x, indicating that values of those bytes are irrelevant for purposes of determining if the predetermined bytes of the packet header match the $N_1$ bytes. The first comparison may be used, for example, to determine a type of packet indicated by an Ethertype field in the packet header.

A second comparison determines if $N_2$ bytes match predetermined bytes of the packet header, beginning at an offset $O_2$, with four of the bytes being irrelevant for purposes of determining if the predetermined bytes of the packet header match the $N_2$ bytes. The second comparison may be used, for example, to determine if the packet header is indicative of a packet carried over a Multi-Protocol Label Switched network. An embodiment may use comparisons specialized for matching a stack of MPLS labels. For example, the comparison may search for a label value or range of values beginning at the top or bottom of the stack and determine a match depending on the location of a label within the stack.

A third comparison determines if $N_3$ bytes match predetermined bytes of the packet header, beginning at an offset $O_3$, with four of the byes being irrelevant for purposes of determining if the predetermined bytes of the packet header match the $N_3$ bytes. The third comparison may be used, for example, to determine if the packet header is indicative of a pseudowire Ethernet packet.

As illustrated in FIG. 5, each successive offset for each successive comparison is larger than prior offsets. In various embodiments, however, successive offsets may be smaller than prior offsets. For many embodiments, the offset corresponds to a size of the header for the protocol used. Similarly, the number of bytes to be matched may also vary, or be the same, depending on particular protocols.

Although the invention has been discussed with respect to various embodiments, it should be recognized that the invention comprises the novel and non-obvious claims supported by this disclosure.

What is claimed is:

1. A method of determining a timing related action by a PHY, comprising:
   receiving a packet;
   determining an encapsulation scheme for the packet by sequentially performing a plurality of comparisons of portions of the packet with programmable register stored bit patterns for different protocols, wherein portions of the packet other than a portion for a first comparison are selected based on an offset, the offset determined based on results of each comparison other than a last of the comparisons; and
   determining an action to take regarding modification of a time stamp of the packet based on a result of at least one of the comparisons of the plurality of comparisons.

2. The method of claim 1, wherein determining the action to take regarding modification of a time stamp of the packet is based on a result of a last comparison of the plurality of comparisons.

3. The method of claim 1, further comprising modifying the time stamp.

4. The method of claim 1 further comprising forming a signature identifying the packet by extracting and concatenating selected source and destination address portions of the packet.

5. A method of determining a time stamp modification action by a PHY of an Ethernet switch, comprising:
   determining an encapsulation scheme for an Ethernet packet by sequentially performing a plurality of comparisons on bits of the packet with different identified bit patterns, each of the different identified bit patterns indicative of a different protocol, with bits of the packet for at least one of the comparisons selected based on an offset determined as a result of a prior comparison;
   determining a location in the packet of a time stamp; and
   determining an action to take with respect to the time stamp.

6. The method of claim 5 wherein determining an encapsulation scheme for an Ethernet packet by sequentially performing comparisons on bits of the packet with identified bit patterns comprises:
   determining an encapsulation scheme for the Ethernet packet by substantially simultaneously performing at least one comparison on bits of the packet with different preidentified bit patterns.

7. The method of claim 5, further comprising modifying the time stamp based on the determined action.

8. The method of claim 5, further comprising forming a signature identifying the packet by selecting portions of the packet.

9. A method of determining a timing related action by a PHY, comprising:
- receiving a packet;
- determining an encapsulation scheme for the packet by performing a plurality of comparisons of portions of the packet with programmable register stored bit patterns for different protocols;
- wherein the plurality of comparisons are performed in an order, and the order of at least some of the subsequent comparisons is dependent on a result of at least one prior comparison; and
- determining an action to take regarding modification of a time stamp of the packet based on a result of at least one of the comparisons of the plurality of comparisons; and
- further comprising determining an offset based on results of each comparison other than a last of the comparisons.

10. The method of claim 9, wherein the portions of the packet other than a portion for the first comparison are selected based on the offset.

11. The method of claim 10, further comprising modifying the time stamp.

* * * * *